US008862542B2

(12) United States Patent
Darcy (10) Patent No.: US 8,862,542 B2
(45) Date of Patent: Oct. 14, 2014

(54) REPLICATING DATA OBJECTS WITHIN A STORAGE NETWORK

(75) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 298 days.

(21) Appl. No.: 12/872,022

(22) Filed: Aug. 31, 2010

(65) Prior Publication Data

US 2012/0054155 A1 Mar. 1, 2012

(51) Int. Cl.
*G06F 7/00* (2006.01)
*G06F 17/00* (2006.01)
*G06F 11/20* (2006.01)

(52) U.S. Cl.
CPC ................................. *G06F 11/2094* (2013.01)
USPC ........................................................ 707/623

(58) Field of Classification Search
USPC .......................................... 707/634, 999.204
See application file for complete search history.

(56) References Cited

U.S. PATENT DOCUMENTS

| 2007/0244940 | A1* | 10/2007 | Devarakonda et al. | ........ | 707/205 |
| 2010/0223378 | A1* | 9/2010 | Wei | ................ | 709/224 |
| 2010/0274762 | A1* | 10/2010 | Murphy et al. | ............... | 707/636 |
| 2011/0022642 | A1* | 1/2011 | deMilo et al. | ................. | 707/805 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010

Jeffrey Darcy, "Systems and Methods for Searching a Cloud-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
James Michael Ferris, "Systems and Methods for Generating Optimized Host Placement of Data Payload in Cloud-Based Storage Network", U.S. Appl. No. 13/118,075, filed May 27, 2011.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977 filed Feb. 28, 2011.
James Michael Ferris, "Systems and Methods for Migrating Data Among Cloud-Based Storage Networks Via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.
James Michael Ferris, "Systems and Methods for Establishing Upload Channels to a Cloud Data Distribution Service", U.S. Appl. No. 13/037,230, filed Feb. 28, 2011.

(Continued)

*Primary Examiner* — Aleksandr Kerzhner
(74) *Attorney, Agent, or Firm* — Lowenstein Sandler LLP (57) ABSTRACT

Embodiments relate to systems and methods for dynamically replicating data from a primary resource to a secondary resource within a storage network. In particular, a user can select parameters that specify a policy framework. A policy management module can determine one or more attributes associated with resources of the storage network, and enter the one or more attributes into the policy framework to determine a replication policy. The one or more attributes can be determined at any point before or during a replication. The policy management module can then replicate the data according to the replication policy.

25 Claims, 4 Drawing Sheets

(56) References Cited

OTHER PUBLICATIONS

James Michael Ferris, "Methods and Systems to Automatically Extract and Transport Data Associated with Workload Migrations to Cloud Networks", U.S. Appl. No. 13/116,599, filed May 26, 2011.
James Michael Ferris, "Systems and Methods for Cloud Data Deployment Based on Preferential and/or Existing Subscription Relationshlps", U.S. Appl. No. 13/117,331, filed May 27, 2011.
James Michaei Ferris, "Methods and Systems for Data Compliance Management Associated with Cloud Migration Events", U.S. Appl. No. 13/118,123, filed May 27, 2011.
James Michael Ferris, "Systems and Methods for Determining Consistencies in Staged Replication Data to Improve Data Migration Efficiency in Cloud Based Networks", U.S. Appl. No. 13/117,235, filed May 27, 2011.

* cited by examiner

FIG. 4

REPLICATING DATA OBJECTS WITHIN A STORAGE NETWORK

FIELD

The present teachings relate to systems and methods for dynamically replicating data objects within a storage network, and more particularly to platforms and techniques for replicating data objects based on dynamically determined attributes associated with resources in the storage network.

BACKGROUND OF RELATED ART

Data replication can be used to ensure consistency among software or hardware resources in a storage network. In operation, data on a primary server or device is backed up, or replicated, on a secondary file server or device. Therefore, if data is ever lost on the primary server, the replicated data can be recovered from the secondary server. The servers can be local or remote with respect to one another and can be connected via a network such as a local area network (LAN), wide area network (WAN), or metropolitan area network (MAN).

In existing platforms, data is replicated based on a replication policy that specifies how the data is to be replicated from the primary server to the secondary server. In particular, the replication policy includes pre-defined inputs that specify where, when, or how the data is to be replicated, among other relationships. Further, the pre-defined inputs relate exclusively to fixed parameters within the storage network. However, because the inputs are pre-defined, an administrator of the storage network is locked into using those inputs, and therefore the fixed parameters within the storage network, when implementing the policy during replication. As a result, an administrator is not able to modify a data replication in a storage network to accommodate changes in resources of the storage network Therefore, it may be desirable to provide systems and methods for dynamically replicating data objects. In particular, it may be desirable to replicate data objects based on dynamically determined attributes associated with resources in a storage network.

DESCRIPTION OF EMBODIMENTS

Embodiments of the present teachings relate to systems and methods for dynamically replicating data objects within a storage network. In particular, embodiments relate to platforms and techniques for replicating data objects based on dynamically determined attributes associated with resources in the storage network. In embodiments, a policy framework can be input by a user or can be generated automatically in the storage network by processes or other logic. The policy framework can specify one or more parameters corresponding to one or more attributes of the resources in the storage network. The attributes can be dynamically determined at any point before or during the replication process. In embodiments, the attributes can be dynamically determined during the generation of a replication policy. In other embodiments, the parameters themselves of the framework can be dynamically determined at any point before or during the replication process. A policy management module can generate the replication policy based on the policy framework, the variables of the policy framework, and the determined attributes, and data objects can be replicated based on the replication policy. Therefore, the framework can be a dynamic and fully general formula or equation that can be used to generate a replication policy.

Embodiments described herein can be implemented in or supported by a storage network architecture. In embodiments, the storage network can be a cloud-based network. As used herein, a "storage network" can be any network configured with storage resources such as, for example, servers, hard drives, virtual memory, databases, random access memory (RAM), other memory, and any other resource configured to store data. The storage resources can be directly connected or connected via a network such as, for example, a cloud-based network, a local area network (LAN), wide area network (WAN), wireless network, virtual private network (VPN), storage area network (SAN), and other networks.

As used herein, "replication" can be any process that can be used to duplicate, copy, or otherwise reproduce one or more data objects from one resource to another resource. The "'primary" or "first" resource can refer to the resource from which the data objects are to be copied and the "secondary" or "second" resource can refer to the resource to which the data objects are to be copied. Further, as used herein, a "data object" can be any type of file, application, value, variable, function, data structure, or the like that can be read from and/or stored on a resource. As used herein, a "user" can refer a person, customer, subscriber, administrator, corporation, organization, or other entity accessing modules or inputting values associated with the storage network. In embodiments, the user can operate or manage computer software or hardware that can generate or determine a replication policy to be applied to a data object.

As used herein, a "cloud-based network" can comprise a collection of resources that can be invoked to instantiate a virtual machine, process, or other resource for a limited or defined duration. In embodiments, the cloud-based network can be implemented as a software as a service (SaaS). For example, vendors such as independent software vendors (ISVs) can supply software resources for use with other resources in a cloud-based network. Resources in the cloud-based network can include any hardware, software, or communications resources, such as ports or channels provided to a virtual machine or other machine or process in the cloud. Resources can likewise include services, such as Web-based services deployed in the cloud, for example security or identity management services and/or other resources.

Figure 1:
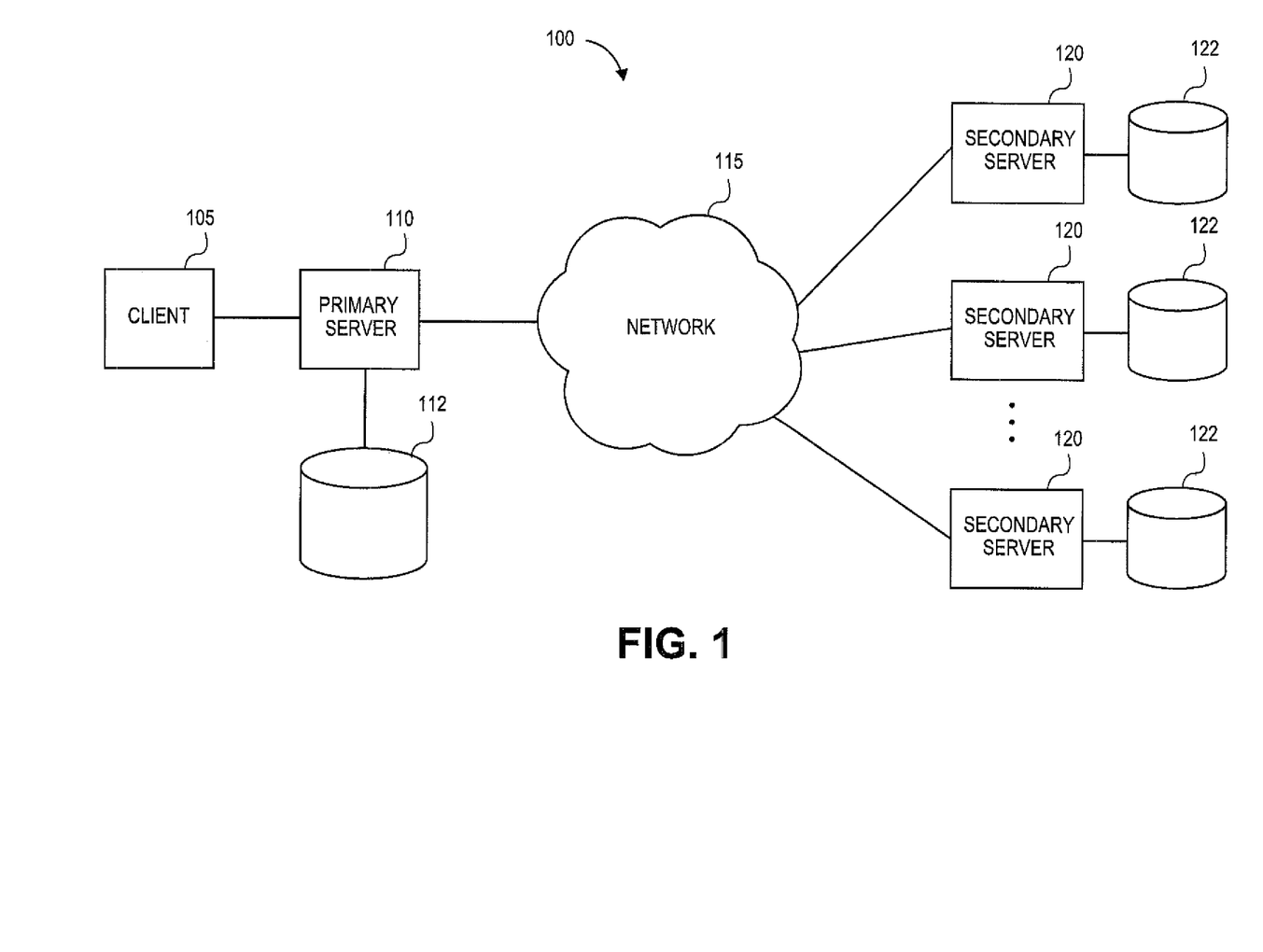
FIG. 1 illustrates an overall storage network architecture in which various embodiments of the present teachings can be practiced.

FIG. 1 illustrates an exemplary storage network 100 for facilitating data replication. The storage network 100 comprises a client 105 coupled to a primary server 110. In embodiments, the client 105 can couple to the primary server 110 either locally or through a network such as a LAN, wireless network, or other networks. The client 105 can be a personal computer (PC), workstation, cell phone, or other wired or wireless computing device capable of communicating data. The primary server 110 can be configured to facilitate data replication and can be coupled to a repository 112. In embodiments, the primary server 110 can comprise local storage configured to store data. The repository 112 can comprise any type of storage such as, for example, hard drives, virtual memory, databases, random access memory (RAM), and other memory. The repository 112 can be accessed by users or by software or applications independent from or associated with resources of the storage network 100. It should be appreciated that the primary server 110, repository 112, or any other resource associated with the storage network 100 can be implemented in a cloud-based network.

The storage network 100 can further comprise a set of secondary servers 120 that can be coupled to the primary server 110 via a network 115. Although described herein as the primary server and the set of secondary servers, it should be appreciated that the primary server and the set of secondary servers can be interchangeable such that any server can be an originating or primary server, as well as a target or secondary server. In embodiments, the network 115 can be a LAN, WAN, MAN, or any other network. The set of secondary servers 120 can each be coupled to a secondary repository 122 comprising any type of storage such as, for example, hard drives, virtual memory, databases, random access memory (RAM), and other memory. The primary server 110 can be configured to communicate data to any of the set of secondary servers 120 via the network 115. In embodiments, the communicated data can be data stored on primary repository 112 that is to be replicated on a secondary repository 122 via a respective secondary server 120.

Figure 2:
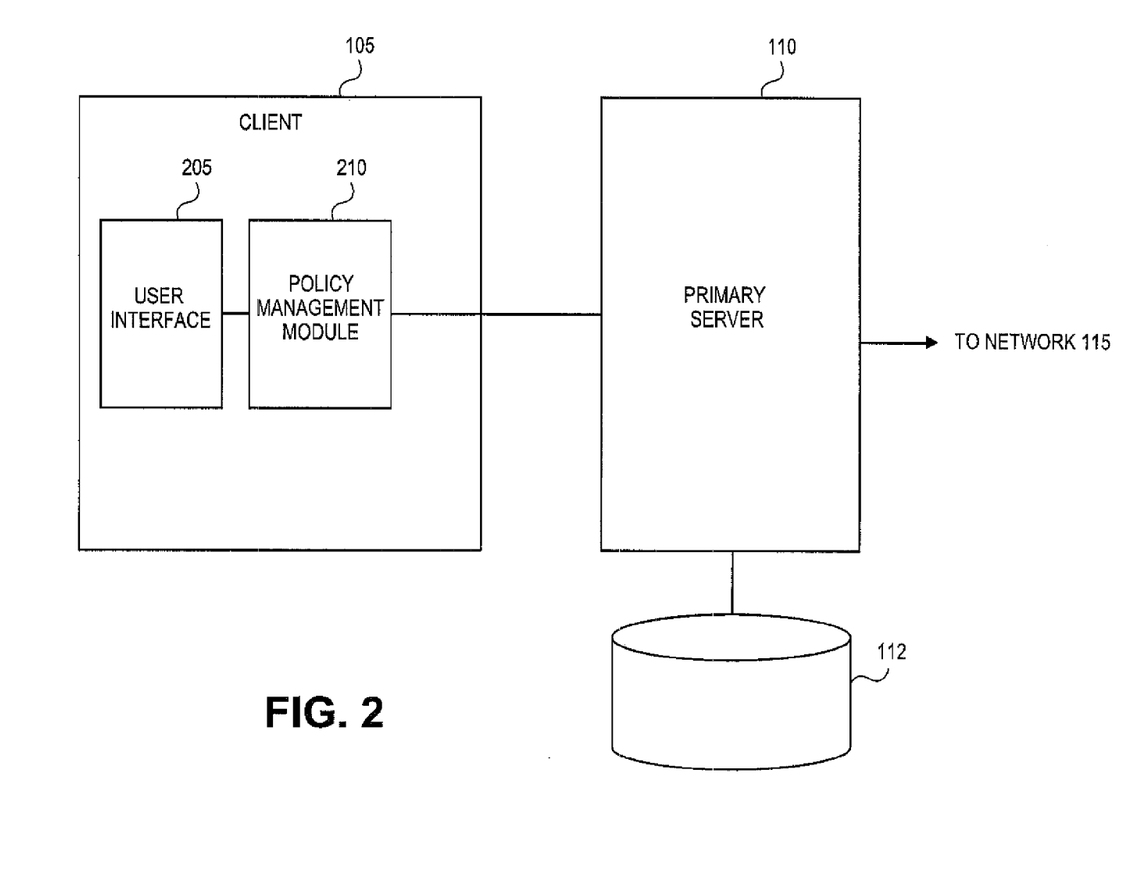
FIG. 2 illustrates an overall storage network architecture in which various embodiments of the present teachings can be practiced in another regard, according to various embodiments.

FIG. 2 illustrates an exemplary configuration that can be used in systems and methods for dynamically replicating data objects. In embodiments as shown, the client 105 can comprise a user interface 205 and a policy management module 210. It should be also appreciated that the user interface 205 and policy management module 210 as shown in FIG. 2 can be implemented in the client 105, the primary server 110, a combination thereof, or any other resource associated with the storage network 100.

The user interface 205 can be configured to receive parameters from a user, owner, administrator, or other entity operating the client 105 or other resource. In embodiments, the parameters can be related to a replication policy and can specify where, how, and/or when the data from the primary server 110 is to be replicated. In embodiments, the parameters can specify any characteristic related to the replication of a data object. For example, the parameters can specify that data associated with the primary server 110 is to be replicated on resources associated with exactly two of the secondary servers 120. The policy management module 210 can be configured to perform the data replication based on the parameters. For example, the policy management module 210 can retrieve data from the repository 112 and provide, via the primary server 110 and the network 115, the data to any applicable secondary server 120 for storage on any applicable secondary repository 122, as specified by the parameters.

In embodiments, the parameters can be dynamically determined based on values associated with any resources of the storage network 100, any new policy implementations, or other factors. For example, one or more of the set of secondary servers, as shown in FIG. 1, can be designated as one or more business units such as, for example, operations, support, and other business units. Upon detection of the designation, the policy management module 210 can dynamically enter a new parameter into a framework, or, this case, the framework can specify that the data be replicated only on servers that are of a specific one or more business units. It should be appreciated that other ways of determining new parameters is envisioned. For example, parameters can be dynamically determined based on characteristics of the resources of the storage network such as, for example, business unit, data function, legal or regulatory jurisdiction, cloud or data-center provider, and other characteristics related or unrelated to data replication.

According to embodiments, the policy management module 210 can manage the replication policy based on the received or determined parameters and on attributes that can be determined from resources associated with the storage network 100. In embodiments, the attributes can be dynamically determined from any of the primary server 110, the repository 112, the client 105, the data objects to be replicated, the set of secondary servers 120, the secondary repositories 122, and/or any other resource associated with the storage network 100. In embodiments, the replication policy can specify variables that the attributes can fulfill. For example, the replication policy can specify that a data object is to be replicated if the data object has a size greater than 10 megabytes. For further example, the replication policy can specify that a data object is to be replicated on only secondary repositories 122 that meet a set of security requirements. For further example, the replication policy can specify that spreadsheet files are to be replicated on the two most proximate secondary repositories 122. It should be appreciated that any type of attribute associated with resources of the storage network 100 can be used to determine the replication policy such as, for example, data types, data sizes, data names, locations of resources, security attributes, data owners, and other attributes.

For example, a branch of a bank can implement a dynamic data replication policy such that data associated with daily activity of the branch (e.g. transactions, new account openings, etc.) is to be replicated at close of business each day. A framework of the data replication policy can specify that the data is to be replicated on servers of regional offices of the bank within a 50 mile radius of the branch. A replication system of the branch can determine, at close of business each day, all of the regional offices located within a 50 mile radius of the branch. The data replication policy can be generated based on the determined regional offices, and the activity data can be replicated on servers of the determined regional offices. Therefore, if a new regional office is constructed within a 50 mile radius of the branch, the data replication policy need not be reconfigured and reimplemented to include the new regional office. Instead, the replication system of the branch can dynamically determine that there is a new regional office within a 50 mile radius of the branch and appropriately replicate the activity data on servers of the new regional office.

In other embodiments, even after a framework of a data replication policy is created by a user or other system logic, the policy management module 210 can dynamically add new attributes into the framework. For example, and continuing with the bank example as described herein, suppose that the regional offices of the bank are assigned to a specific legal or regulatory jurisdiction. For example, each regional office can be assigned a regulatory jurisdiction consistent with the state in which the regional office is located, along with details of the regulations, such as, for example, what type of data needs to be reported in which state. The replication system can detect the jurisdiction assignations and add one or more new attributes into the already-created framework. For example, the replication system can append, to the framework, a parameter that specifies that the activity data is to be replicated only on servers of regional offices that require that all savings activity of a branch needs to be reported. The replication system can determine, from the regulatory assignments, which regional offices have that requirement, and appropriately replicate the activity data on servers of those regional offices. As such, not only can the replication system dynamically determine the attributes for the parameters in the framework, but the replication system can also dynamically determine the parameters to enter into the framework.

In embodiments, the replication policy parameters entered into or received via the user interface 205, or dynamically determined from resources in the storage network, can serve as a framework for the actual replication policy that is to be applied to a data object. In operation, the policy management module 210 can determine the applicable attributes associated with the storage network 100 that are specified by the parameters. For example, assume a first set of secondary repositories is connected to a primary repository via a wired network and a second set of secondary repositories is connected to the primary repository via a wireless network. If the parameters specify that a data object is to be replicated only on secondary repositories that are connected to the primary repository via the wireless network, the policy management module 210 can determine that the second set of secondary repositories are indeed connected to the primary repository via the wireless network, and replicate the data object on those determined secondary repositories. In embodiments, the attributes can be determined at any point before or during a replication process. In other embodiments, the parameters can be dynamically determined and/or entered into a framework at any point before or during the replication process. In further embodiments, the policy management module 210 can reuse the framework with already-determined attributes in a subsequent replication, or can determine new attributes in the subsequent replication.

Figure 3:
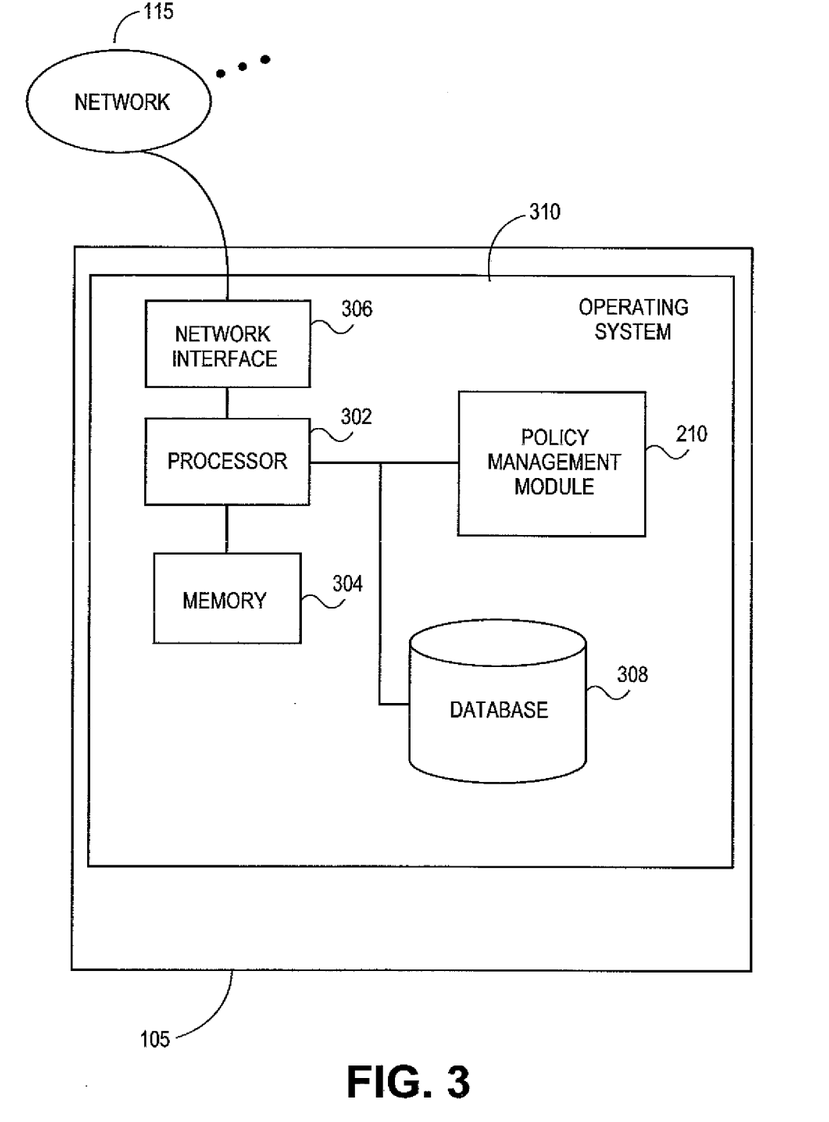
FIG. 3 illustrates an exemplary hardware configuration implemented in a storage network, according to various embodiments.

FIG. 3 illustrates an exemplary diagram of hardware and other resources that can be incorporated in the client 105 configured to communicate with the primary server 110 and the set of secondary servers 120 (as shown in FIG. 1) via the one or more networks 115, according to embodiments. It should be understood that the resources can be implemented in other resources associated with the storage network 100. In embodiments as shown, the client 105 can comprise a processor 302 communicating with memory 304, such as electronic random access memory, operating under control of or in conjunction with an operating system 310. The operating system 310 can be, for example, a distribution of the Linux™ operating system, the Unix™ operating system, or other open-source or proprietary operating system or platform. The processor 302 can also communicate with one or more computer readable storage medium 308, such as hard drives, optical storage, databases, and the like. The processor 302 can further communicate with a network interface 306, such as an Ethernet or wireless data connection, which in turn communicates with the one or more networks 115, such as the Internet or other public or private networks.

The processor 302 can also communicate with the computer readable storage medium 308 and the policy management module 210, to execute control logic, generate a replication policy, replicate data objects according to the replication policy as described herein, and control the operation of the servers and other resources associated with the storage network 100. Other configurations of the client 105, associated network connections, and other hardware and software resources are possible.

Figure 4:
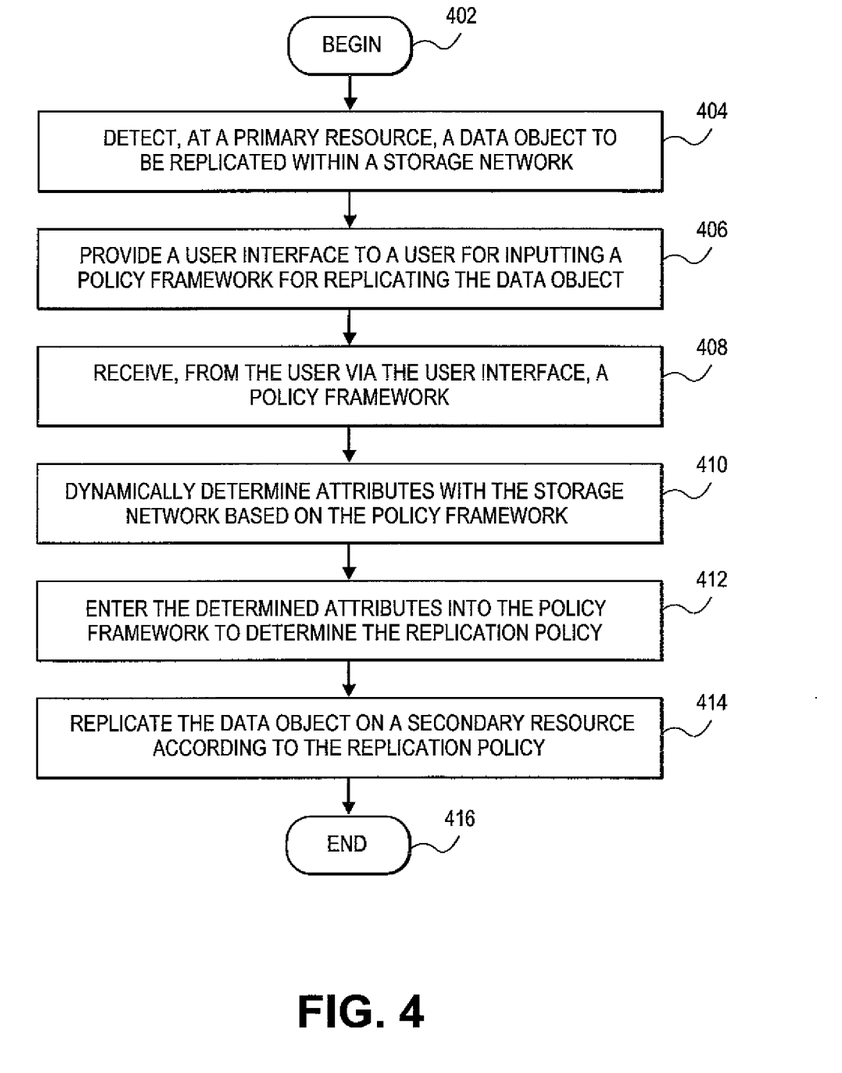
FIG. 4 illustrates a flowchart for dynamically replicating data within a storage network, according to various embodiments.

FIG. 4 illustrates a flowchart for overall dynamic data replication in a storage network, according to various embodiments. In embodiments, the data replication can be among local or remote resources in a storage network. In 402, processing can begin. In 404, a data object to be replicated within a storage network can be detected. In embodiments, the data object can be detected on a primary resource within the storage network. In 406, a user can be provided with a user interface for inputting a policy framework for replicating the data object. In embodiments, the user can be any owner, operator, administrator, or the like with the ability to conduct the replication of the data object. Further, in embodiments, the user can access the user interface via a client coupled to the resource resource. In further embodiments, the policy framework can be generated automatically by any process or logic without the need for the user interface.

In 408, the policy framework can be received from the user via the user interface. In embodiments, the policy framework can specify parameters and can comprise one or more variables, as discussed herein. In other embodiments, the parameters can be dynamically determined based on resources of the storage network or other factors, and can be entered into the framework even after the framework has been created, as discussed herein. In 410, the policy management module 210 or other logic can determine attributes associated with the storage network based on the policy framework. In embodiments, the attributes can be associated with the primary resource, the data object itself, any candidate resources on which the data object is to be replicated, or any other resources associated with the storage network. In further embodiments, the attributes can be dynamically determined at any point before or during the data object replication.

In 412, the policy management module 210 or other logic can use the determined attributes with the policy framework to determine a replication policy. In embodiments, the attributes can be values for the variables specified in the policy framework, as discussed herein. In 414, the policy management module 210 or other logic can replicate the data object on a secondary resource according to the replication policy. In embodiments, the data object can be replicated on more than one secondary resource. In 416, processing can end.

The foregoing description is illustrative, and variations in configuration and implementation may occur to persons skilled in the art. For example, while embodiments have been described which operate using one policy management module 210 and associated storage network 100, in embodiments, one or more of policy management module 210 and storage network 100, and/or other servers, data stores, and/or other logic or resources can be used. For further example, while embodiments have been described in which data replication policies are generated or modified, in embodiments, the data replication policies and resources associated with the policies can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
   determining, by a processing device of a replication system, a policy framework comprising a plurality of parameters to replicate a data object on a storage network, wherein the parameters comprise characteristics defining at least one of where, when, or how the data object is replicated on the storage network;
   generating a replication policy in view of the policy framework, wherein the parameters of the policy framework are updated in view of changes to values corresponding to resources of the storage network that are associated with the parameters;

determining, by the replication system subsequent to the generating of the replication policy, attributes of the storage network to which the replication policy applies in view of the parameters of the policy framework, wherein the attributes comprise a specification of a property of at least one of the data object or the resources of the storage network;

detecting a change in one of the attributes;

generating a new parameter of the policy framework in view of the change in the detected attribute of the storage network; and entering the generated new parameter into the policy framework.

2. The method of claim 1, further comprising:

replicating the data object from a first resource to a second resource according to the replication policy.

3. The method of claim 2, wherein at least one of the first resource or the second resource is instantiated in a cloud-based network.

4. The method of claim 2, wherein the second resource is determined in view of a detected storage network attribute that has been entered into the policy framework as a generated parameter.

5. The method of claim 1, wherein the policy framework is received via a user interface.

6. The method of claim 2, wherein one of the attributes corresponds to at least one of the first resource, the second resource, or the data object.

7. The method of claim 1, wherein the property of the attributes comprises at least one of a data type, data size, data name, location, security attribute, or data owner.

8. The method of claim 1, further comprising:

generating a notification indicating the replication policy; and providing the notification to a user.

9. The method of claim 1, wherein the policy framework comprises a variable.

10. The method of claim 9, wherein one of the attributes is a value for the variable.

11. A system, comprising:

a memory; and a processing device communicably coupled with the memory, the processing device to:

determine a policy framework comprising a plurality of parameters to replicate a data object on a storage network, wherein the parameters comprise characteristics defining at least one of where, when, or how the data object is replicated on the storage network;

generate a replication policy in view of the policy framework, wherein the parameters of the policy framework are updated in view of changes to values corresponding to resources of the storage network that are associated with the parameters;

determine, subsequent to the generating of the replication policy, attributes of the storage network to which the replication policy applies in view of the parameters of the policy framework, wherein the attributes comprise a specification of a property of at least one of the data object or the resources of the storage network;

detect a change in one of the attributes;

generate a new parameter of the policy framework in view of the change in the detected attribute of the storage network; and enter the generated new parameter into the policy framework.

12. The system of claim 11, wherein the processing device further to replicate the data object from a first resource to a second resource according to the replication policy.

13. The system of claim 12, wherein at least one of the first resource or the second resource is instantiated in a cloud-based network.

14. The system of claim 12, wherein the second resource is determined in view of a detected storage network attribute that has been entered into the policy framework as a generated parameter.

15. The system of claim 11, wherein the policy framework is received via a user interface.

16. The system of claim 12, wherein one of the attributes corresponds to at least one of the first resource, the second resource, or the data object.

17. The system of claim 11, wherein the property of the attributes comprises at least one of a data type, data size, data name, location, security attribute, or data owner.

18. The system of claim 11, wherein the processing device further to:

generate a notification indicating the replication policy; and provide the notification to a user.

19. The system of claim 11, wherein the policy framework comprises a variable.

20. The system of claim 19, wherein one of the attributes is a value for the variable.

21. A non-transitory computer readable storage medium having instructions recorded thereon that, when executed by a processing device, cause the processing device to perform operations comprising:

determining, by the processing device of a replication system, a policy framework comprising a plurality of parameters to replicate a data object on a storage network, wherein the parameters comprise characteristics defining at least one of where, when, or how the data object is replicated on the storage network;

generating a replication policy in view of the policy framework, wherein the parameters of the policy framework are updated in view of changes to values corresponding to resources of the storage network that are associated with the parameters;

determining, by the replication system subsequent to the generating of the replication policy, attributes of the storage network to which the replication policy applies in view of the parameters of the policy framework, wherein the attributes comprise a specification of a property of at least one of the data object or the resources of the storage network;

detecting a change in one of the attributes;

generating a new parameter of the policy framework in view of the change in the detected attribute of the storage network; and entering the generated new parameter into the policy framework.

22. The non-transitory computer readable storage medium of claim 21, wherein the operations further comprise replicating the data object from a first resource to a second resource according to the replication policy, wherein at least one of the first resource or the second resource is instantiated in a cloud-based network.

23. The non-transitory computer readable storage medium of claim 21, wherein the property of the attributes comprises at least one of a data type, data size, data name, location, security attribute, or data owner.

24. The non-transitory computer readable storage medium of claim 22, wherein one of the attributes corresponds to at least one of the first resource, the second resource, or the data object.

25. The non-transitory computer readable storage medium of claim 22, wherein the second resource is determined in view of a detected storage network attribute that has been entered into the policy framework as a generated parameter.

* * * * *